July 15, 1930.  P. SCHOONENBERG ET AL  1,770,810
SORTING DEVICE
Filed Oct. 25, 1926  2 Sheets-Sheet 1

Inventors
P. Schoonenberg and
J. J. Hardenberg
by Langner, Parry, Card & Langner
Attys.

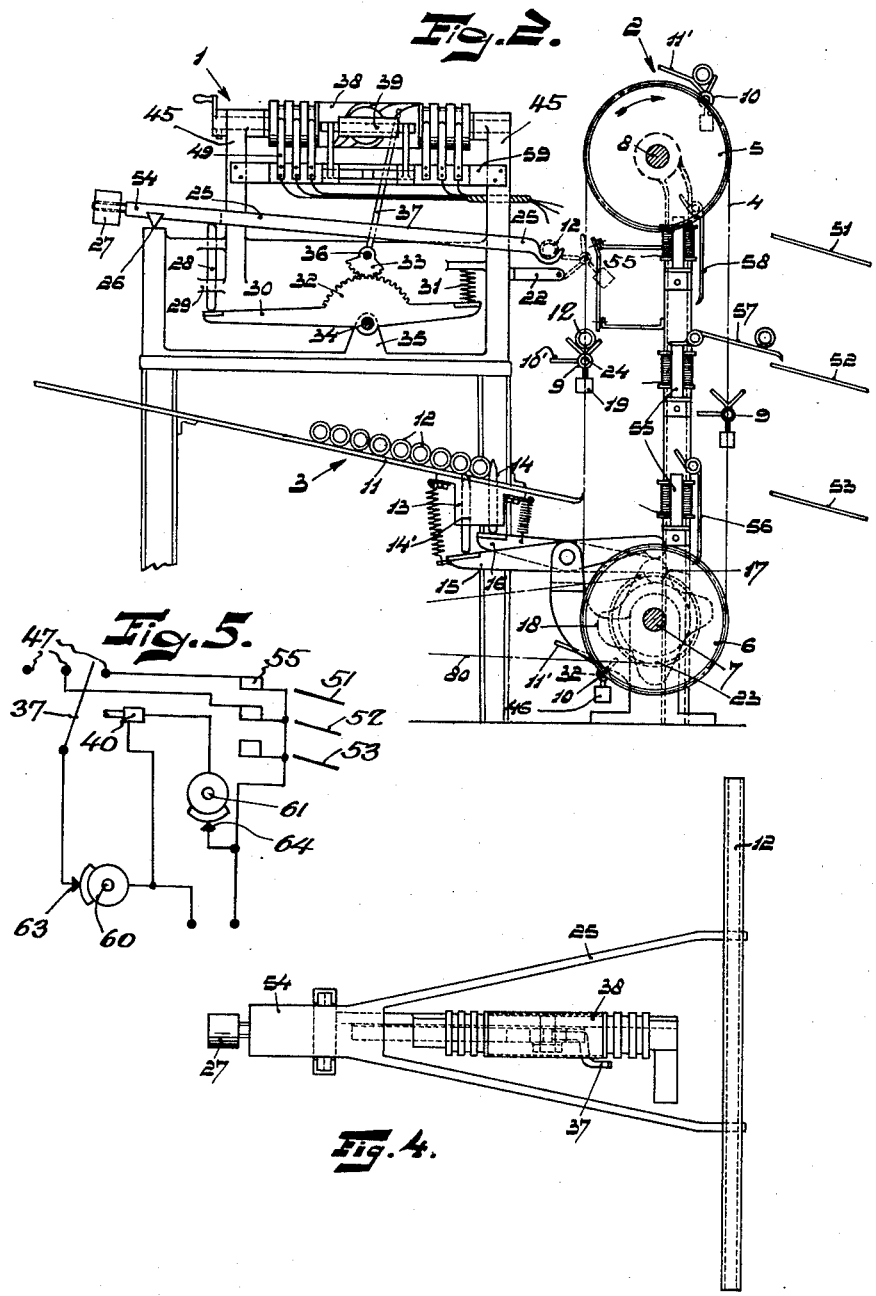

Patented July 15, 1930

1,770,810

UNITED STATES PATENT OFFICE

PANCRAS SCHOONENBERG AND JAN JESAYAS HARDENBERG, OF EINDHOVEN, NETHERLANDS, ASSIGNORS TO N. V. PHILIPS' GLOEILAMPENFABRIEKEN, OF EINDHOVEN, NETHERLANDS

SORTING DEVICE

Application filed October 25, 1926, Serial No. 144,125, and in Netherlands November 26, 1925.

This invention relates to a device for sorting articles of different weight.

In known apparatus for arranging articles in classes according to their weight, these articles are carried by a conveying device over different balances which are adjusted to respond to a definite weight and which deflect when loaded with such a weight, the articles being placed in definite groups by this movement. According to the more or less fine sorting or to the more or less different weights of the articles to be sorted, it is necessary in that case to arrange side by side a greater or less number of balances so that these devices take up considerable room and are not easily adapted to a changing use.

The device according to the invention comprises a weighing device and a mechanism for adjusting a sorting device according to the different deflections of the weighing device.

This affords the advantage that a single balance is sufficient, a rapid adaptation to different sortings being ensured by a re-adjustment of the balance. The sorting device may be mounted near the weighing device so that the articles after being weighed are directly conveyed into different compartments of the sorting device.

According to the invention the device comprises a conveyor for the articles, a weighing device and a number of sorting units operatively arranged along the path of said conveyor, a contact member provided on such weighing device and adapted to follow the deflection thereof, a number of contacts each corresponding with one of said units, and means for energizing the sorting units according to the co-operation of said member with said contacts.

The weighing device may operate according to different principles; and in general, the device will be provided with a scale or support on which the articles to be weighed are placed and which, in accordance with the different loads, will assume different positions.

Figure 1:
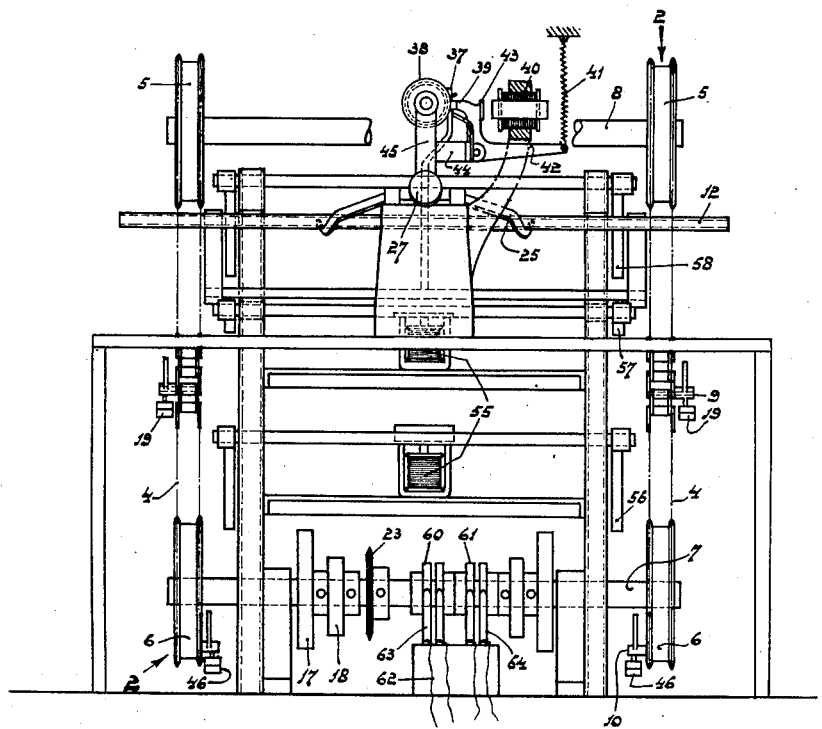
Figure 3:
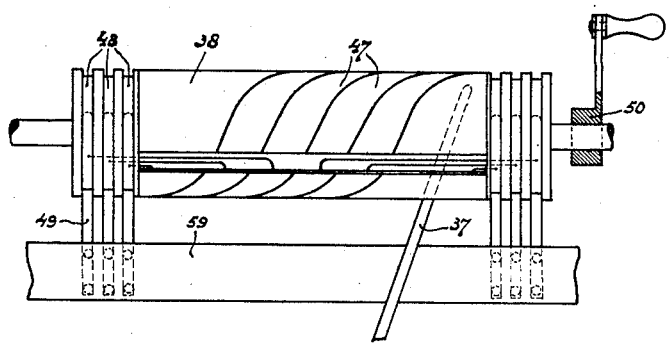

An embodiment of the invention is illustrated by way of example in the accompanying drawings in which:

Figure 1 is a front view of the machine in which glass rods are sorted according to their weight, Figure 2 is a side view of the machine of Figure 1, Figure 3 is a detail of the contact mechanism, Figure 4 is a plan of the weighing device, and Figure 5 is a diagrammatic view illustrating the electrical circuits.

The device consists of three parts viz, a weighing device 1, a conveying device 2 and a device 3 (Figure 2) for supplying the glass tubes that have to be weighed.

The conveying device consists of chains 4, running on sprocket gears 5 and 6 which are adapted to rotate on shafts 8 and 7 respectively and which are driven by means of a sprocket gear 23 and a chain 80. The chains 4 are provided with carriers 9 and 10 which are secured to the chains so as to be pivoted on points 24 and 32 respectively and to which are secured weights 19 and 46, respectively, for causing the said carriers to hang constantly in a definite position so that when a glass tube comes to lie in the fork of the carrier, the latter is prevented from being tipped over by the weight of the tube. The carriers serve to supply glass tubes 12, arranged on guides 11, one by one to a weighing device and to remove said glass tubes, after they have been weighed, from this device and to carry them to a sorting device.

In order to isolate the glass tubes one by one, the guides 11 are provided with a device whereby each time one tube is isolated from the others the other tubes are permitted to advance to present another tube for removal. For this purpose two stops 13 and 14 are mounted in a housing 14' so as to be vertically movable, said housing being secured to the guides 11. At their lower ends these stops bear on two levers 15 and 16 respectively which are actuated by cams 17 and 18 mounted on the shaft 7. The stops 13 and 14 are alternately raised and lowered in such a manner that at one time a tube comes to a position lying between the two stops and then the stop 14 is drawn away so that the tube has the opportunity to roll down along the guides 11 in the bent lower ends of which it comes to rest. The movement of the chain is so adjusted that the carrier 9 takes up the tube lying at the lower ends of the guides and transports it upwards. During this upward movement an arm 10' upon this carrier engages a lug 22 in consequence of which the carrier is tilted to such an extent that the tube falls out of the fork into the bent ends of the arms 25 of the lever 54. When the chain moves further on, the carrier 10 takes up the tube 12 from the arms 25. The movement of the stops 13 and 14 is so regulated that no tube lies at the lower end of the guides 11 when the carrier 10 passes this end. As shown in the drawings, the carrier 10 is provided with a finger 11', having a length such that the carried when passing the supports 25, lifts the tube therefrom and carries it over the sprocket gears 5 and to a sorting mechanism.

The space of time betwen the lodging of the rod on the arms 25 and the taking up of the said rod from these arms is utilized for weighing the rod. For this purpose the weighing device 1 has mounted thereon a lever 54 which can oscillate on a fulcrum 26 and which at one end carries a counter weight 27. The lever bears on a pin 28 which is vertically movable in brackets 29 and is depressed by the lever 54 on its downward swinging to engage one end of a lever 30. This lever 30 is adapted to oscillate on a pivot 34 secured to a support 35 and at its other end it bears upwardly against a spring 31. The lever 30 is provided with a toothed segment 32 which when turning actuates a sector 33 to which is rigidly secured a needle 37 and is mounted on a pivot 36. When a glass rod has been laid on the arms 25 of the lever 54 the mechanism described will impart a certain angular displacement to the lever 30 and consequently also to the pointer 37. In order to insure in this case, a rapid adjustment, it is advantageous to damp the movement of the lever 30, which may be effected by any suitable means.

When the weighing device has adjusted itself definitely to a determined load, the pointer 37 is forced by a lug 39 against a contact roller 38 whereupon an electric circuit is closed which energizes the related one of the magnets 55 of the sorting-device, the needle 37 being mounted for this purpose so as to be insulated from the roller.

The lug 39 forms part of an angle lever 42 (Figure 1) which is mounted for rocking movement on a bracket 44 secured to the weighing device and which at one of its ends has secured to it a spring 41. The bell crank is provided with an armature 43 opposite which an electro-magnet 40 is arranged. The roller 38 is rotatably mounted by means of supports 45 and is provided at its surface with helical contact strips 47 (see Figure 3) which are electrically connected to contact rings 48 at both ends of the roller, contacts 49 being in contact with these rings. On the shaft of the roller is also mounted a hand crank 50 which permits the roller to be rotated through a definite angle, owing to which the contact strips are enabled to occupy different positions with relation to the needle 37. The contacts 49 are secured to a rod 59 secured to the weighing device and are each electrically connected to a respective magnet of the sorting device. The sorting device illustrated comprises only three magnets 55, each of which when excited actuates a lever 56, 57 or 58, said levers being so arranged that they can be brought into and out of the path of the glass rods applied by the carriers. The result is that when one of the magnets is energized, the corresponding lever is actuated to lift the glass rod out of the carrier 10 and deposit it in the respective one of the receiving devices 51, 52 or 53. The electric current required for the energization of these magnets is interrupted and closed by contact mechanism 60 and 61 each consisting of a pair of cam-shaped contact disks keyed on the shaft 7 and pairs of spring contacts 63 and 64 secured to a block 62. The contacts 63 and the contact disks 60 control the supply of current traversing the magnets of the sorting device whereas the contact disks 61 and the contacts 64 control the supply of current to the magnet 40 which periodically actuates the bell crank 42 and the lug 39. The contact disks 60 and the contacts 63 are arranged in such a manner that the current is not closed until the needle 37 has been forced by the lug 39 against the contact roller 38.

In Figure 5, a circuit diagram is shown in which the cams and the contacts are indicated with the connections with the magnet 40 and the needle 37 and contact strips 47.

During use of the machine, tubes 12 having the same length and the same external diameter are supplied. One by one these rods are laid by the carriers 9 on the supports 25, submitted to weighing and then lifted by the carriers 10 from that support and carried past the various levers 58, 57 and 56. During the weighing the needle 37 assumes a definite position and when no longer oscillating it will be pressed by the lug 39 against the contact roller 38. The circuit is then closed through that one of the magnets 55 which is in circuit with one of the contact strips 47, which results in one of the levers 56, 57 or 58 being brought into the path of the glass tubes supplied by the carriers 10. The tube is lifted from these carriers by that lever which has been adjusted to active position and rolls by gravity into the respective one of the receivers 51, 52 or 53. As the tubes 12 have the same length and the same external diameter, their difference in weight will indicate the difference in thickness of their walls.

What we claim is:

1. A device for sorting articles of different weight, comprising a conveyor for the articles, a weighing device and a number of sorting units, operatively arranged along the path of said conveyor, a contact member provided on said weighing device and adapted to follow the deflection thereof, a number of contacts each corresponding to one of said sorting units co-operating with said member, and means for energizing the sorting units according to the co-operation of said member with said contacts.

2. A device for sorting articles of different weight, comprising a conveyor for the articles, a weighing device and a number of sorting units operatively arranged along the path of said conveyor, a contact member on said weighing device adapted to follow the deflection thereof, a number of contacts each corresponding to one of said sorting units co-operating with said member, a plurality of members movable into the path of the articles on said conveyor and each associated with a particular unit, and means to energize said units, each of which, when energized, moves the particular member associated therewith into the path of the articles on said conveyor.

3. A device for sorting articles of different weight, comprising a conveyor for the articles, a weighing device and a number of sorting units operatively arranged along the path of said conveyor, a contact member on said weighing device adapted to follow the deflection thereof, a number of movable contacts, each corresponding to one of said sorting units, means for moving the contacts into or out of the path of said member, and means for selectively energizing the sorting units, according to the co-operation between said member and said contacts.

4. A device for sorting articles of different weight, comprising a conveyor for the articles, a weighing device and a number of electrically operated sorting units, all arranged along the path of said conveyor, a contact member on said weighing device adapted to follow the deflection thereof, a number of contacts each corresponding to one of said units and adapted to co-operate with said member, and means for energizing said units.

5. A device for sorting articles of different weight, comprising a conveyor for the articles, a weighing device and a number of magnets operatively arranged along the path of said conveyor, a plurality of members, each associated with one of said magnets and each movable into the path of the articles on said conveyor when the corresponding magnet is energized, a contact member on said weighing device adapted to follow the deflection thereof, a number of contacts, each corresponding to one of said magnets and adapted to co-operate with said member, and means for energizing said magnets.

6. A device for sorting articles of different weight, comprising a conveyor for the articles, a weighing device and a number of sorting units operatively arranged along the path of said conveyor, a needle on said weighing device adapted to follow the deflection thereof, a number of contacts, each related to one of said sorting units and arranged in the path of said needle, means for pressing said needle against said contacts, and a source of energy for energizing said units.

7. A device for sorting articles of different weight, comprising a conveying device for the articles, a weighing device and a number of electrically operated sorting units, all being arranged along the path of said conveyor, a needle following the movements of said weighing device and a roller on which contact strips are helically arranged, said roller being adapted to turn about its axis, means for pressing said needle against said roller, and means for energizing said units.

8. A combination as specified in claim 4, having a device for periodically closing and interrupting the current required for the energizing of said sorting units, said device energizing said units after said weighing device has stopped moving and said member has been brought into contact with said contacts.

9. A device for sorting glass rods or tubes of different weight, comprising a conveyor for the rods or tubes, a weighing device and a sorting device operatively arranged along the path of said conveyor, a mechanism adapted to adjust said sorting device according to the different deflections of said weighing device, carriers provided on said conveyor for holding the rods or tubes and to move the same first along the weighing device and then along the sorting device.

10. A device for sorting glass tubes or rods of different weight, a conveyor for the tubes or rods, carriers on said conveyor, counterweights for keeping the carriers in a determined position relative to the vertical, a weighing device and a sorting device operatively arranged along the path of said conveyor, and means for adjusting said sorting device, according to the different deflections of said weighing device.

11. A device for sorting articles of different weight, comprising a conveyor for the articles, a weighing device and a number of sorting units operatively arranged along the path of said conveyor, a contact member on said weighing device adapted to follow the deflection thereof, a number of contacts each corresponding to one of said sorting units and co-operating with said member, and means for energizing said units after said member has co-operated with said contacts.

12. In a sorting apparatus, the combination of weighing mechanism; a vertical series of compartments to receive articles of different definite weights; feeding mechanism adjacent the inlets of the compartments; means associated with each compartment for deflecting a weighed article thereinto from the feeding mechanism; means controlled by the action of the weighing mechanism for moving into operative position the deflecting means of the compartment corresponding to the weight of the article being weighed and mechanism for delivering the weighed article from the weighing mechanism to the feeding mechanism.

In testimony whereof we affix our signatures, at the city of Eindhoven, this 9th day of October, A. D. 1926.

PANCRAS SCHOONENBERG.
JAN JESAYAS HARDENBERG.